United States Patent [19]
Curtis et al.

[11] Patent Number: 5,703,705
[45] Date of Patent: Dec. 30, 1997

[54] TILT MULTIPLEX HOLOGRAPHY

[75] Inventors: Kevin Curtis, Chatham; William Larry Wilson, Somerville, both of N.J.

[73] Assignee: Lucent Technologies Inc., Murray Hill, N.J.

[21] Appl. No.: 435,706

[22] Filed: May 5, 1995

[51] Int. Cl.$^6$ .............................. G03B 1/26; G03B 1/28; G11B 11/12; G11B 7/007
[52] U.S. Cl. .................. 359/22; 369/103; 359/24
[58] Field of Search ...................... 359/24, 25, 32, 359/3, 7, 22; 369/103, 102; 365/216

[56] References Cited

U.S. PATENT DOCUMENTS

| | | | |
|---|---|---|---|
| 5,339,605 | 8/1994 | Curtis et al. | 359/3 |
| 5,483,365 | 1/1996 | Pu et al. | 359/3 |

OTHER PUBLICATIONS

D.L. Staebler, et al., "Multiple storage and erasure of fixed holograms in Fe-doped LiNbO$_3$", *Appl. Phys. Lett.*, vol. 26, No. 4, p. 183 (1975).
G.A. Rakuljic, et al., *Optics Letts.*, vol. 17, No. 20, p. 1471 (1992).
J.T. LaMacchia, et al., *Applied Optics*, vol. 7, No. 1, p. 91 (1968).
A.P. Yakimovich *Opt. Spectrosc.*, (USSR) vol. 47, No. 5, pp. 530-535 (Nov. 1979).
A. Pu, et al., "Shift holography", *Technical Digest Series*, vol. 10, pp. 219-221, 1995 OSA Conference on Optical Computing.
H. Lee, et al., "Volume holographic interconnections with maximal capacity and minimal cross talk", *J. Appl. Phys.*, vol. 65, No. 6, pp. 2191-2194 (Mar. 1989).
W.T. Rhodes, *Handbook of Optical Holography*, Academic Press, pp. 373-377 (1979).
S. Piazzolla, et al., "Single-step copying process for multiplexed volume holograms", *Optics Letters*, vol. 17, No. 9, pp. 676-678 (1992).
N. Enock, *CD-ROM Librarian*, vol. 7, No. 4, pp. 16-21 (Apr. 1992).

Primary Examiner—Jon W. Henry
Attorney, Agent, or Firm—George S. Indig

[57] ABSTRACT

A system for high density holographic storage announced by Cal Tech is improved. The basic Cal Tech system records successive holograms by physically shifting the recording medium relative to the paired reference and signal beams. By depending on Bragg selectivity, successive holograms may be overlapped and still differentiated in the direction of overlap—in the "x-direction". The claimed system improves storage density by tilting the holographic plane to introduce a Bragg component in the y-direction, thereby enabling differentiation of overlapping holograms in that direction as well.

33 Claims, 3 Drawing Sheets

TILT MULTIPLEX HOLOGRAPHY

TECHNICAL FIELD

Holography.

DESCRIPTION OF RELATED ART

Holography has had great allure since its inception in 1948. The concept, image recording and reconstruction by interference with a reference beam, has, from the start, provoked interest in artistic circles. Its very large storage capacity soon led to contemplated use for digital data storage. Both were given impetus by the introduction of the laser, Which would serve as a practical high-intensity monochromatic light source.

The desire to maximize capacity soon led to multiplexing. A number of means were available for differentiating between successive holograms recorded within the medium. Angle multiplexing differentiates on the basis of different angles of incidence for the reference beam. See, D. L. Staebler, et al., "Multiple storage and erasure of fixed holograms in Fe-doped $LiNbO_3$", Appl. Phys. Lett., vol. 46, no. 4, p. 183, (1975). Alternatively, differentiation between multiplexed holograms may be based on wavelength. See also, G. A. Rakuljic and V. Leyva, OPTICS LETTS., vol. 17, no. 20, p. 1471, (1992). A method described in APPLIED OPTICS, vol. 7, no. 1, p. 91 (1968), records successive images with interpositioned successive ground glass sheets in the reference beam. Image selection during readout depends on selection of the sheet used in recording of that image. This amounts to "phase code multiplexing".

Instead of using the same medium volume, "Spatial multiplexing" records successive holograms in different regions of the medium. Density is limited by hologram size and the need to avoid significant overlapping.

"Volume holography" uses a thick recording medium. The thickness dimension is essential for translating angle change, as well as wavelength change, into Bragg selectivity. A. P. Yakimovich, in Opt Spectrosc. (USSR) vol. 47, no. 5, November 1979, at pp. 530–535, describes use of a spherical reference beam, in lieu of the usual plane wave, and calibrates Bragg selectivity. Implications in differentiating overlapping images are clear.

"Shift holography", was described by A. Pu, et at. at a talk given at the 1995 OSA Conference on Optical Computing, see conference proceedings—Technical Digest Series, vol. 10, pp. 219–221. It provides for high density packing of successive holograms in an x-y array. Overlapping holograms produced by shifting the medium in the "x-direction"—in the grating direction—are differentiated by first-order Bragg selectivity. By slanting the grating so that it lies on a plane oblique to the medium, second order Bragg selectivity may serve for selection in the y-direction. Reported densities are excellent, but required a thick (8 mm) recording medium. Dependence on second order Bragg selectivity places greater demands on material stability—is particularly unforgiving of shrinkage.

Advances in the recording medium have not kept pace. Results reported by Pu, et al. used a free-standing crystal. Cost and manufacture expedience would profit by substitution of a supported organic material layer. To date, acceptable layered media have had a thickness of only one hundred or a few hundred µm. It will be some lime before layered media of desired 8 mm and greater thickness are available. In a preferred embodiment, second order Bragg selectivity is avoided so that the process is made more tolerant of material shrinkage.

SUMMARY OF THE INVENTION

In "flit shift holography", y-direction packing density is improved by tilting the plane of the reference and signal beams (the "plane of incidence") relative to the shift direction of the recording medium. As in all reconstruction, conditions identical to those used in recording, are required - for convenience the plane of the readout and reconstructed signal beam, identical to the plane of incidence, is referred to as the "reconstruction plane". The grating vector direction, no longer entirely in the x-direction, now has a component in the y-direction which enables first order Bragg selection. The increased density makes thinner media feasible. Densities obtainable with 8 mm thickness in prior art shift holography are now obtained with 2 mm thickness.

DETAILED DESCRIPTION

General

Figure 1:
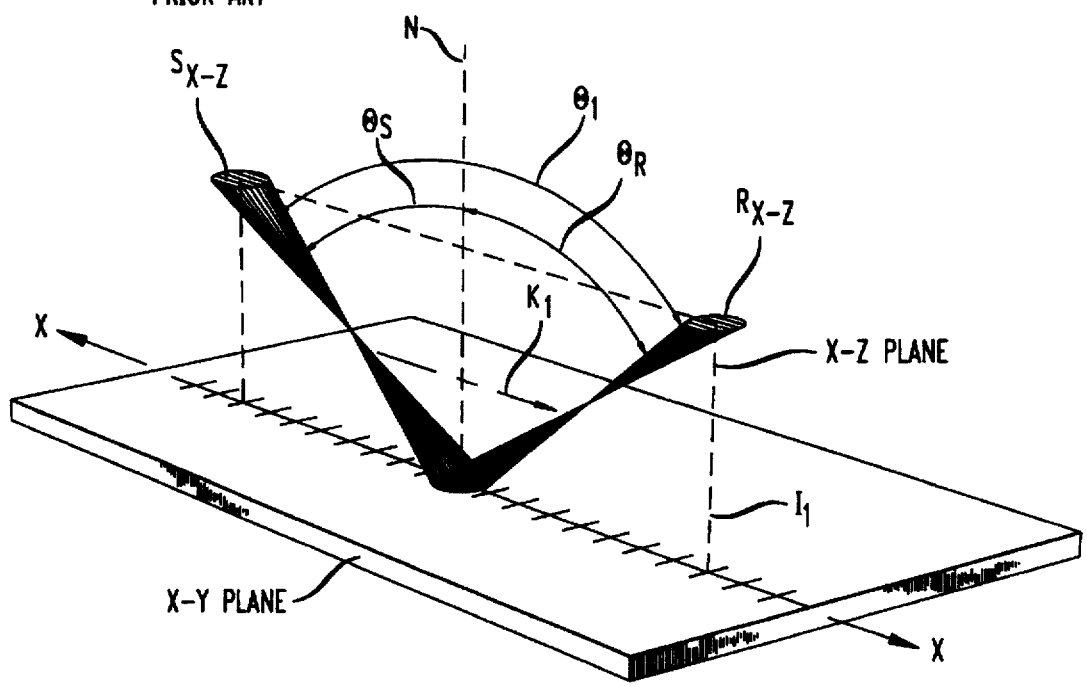
FIG. 1 is a diagrammatic view of an arrangement for holographic storage based solely on first order Bragg selection in the x-direction.

To the extent possible, terminology used in description of prior art shift holography is used in description of the improved procedure. In shift prior art holography, the incoming signal and reference beams define the "plane of incidence" which is orthogonal to the recording medium. After recording a first hologram, the medium is shifted, relative to the beams, in stepwise fashion, along a scan direction which is defined by the line of intersection of the plane of incidence with the medium surface. After a series of overlapping holograms have been recorded, the medium is stepped in the direction normal to the scan direction within the plane of the medium, following which the procedure is repeated. The scan direction is referred to as the "x-direction": the step direction, as the "y-direction".

In prior art shift holography, y-direction selection is based on the comparatively weak second order effect. Poor selectivity in y is compensated by use of a thick recording medium. In reported work, the medium was a free-standing crystal with reference and signal beans introduced through orthogonal crystal surface. A diagram included in the Pu, et al. conference proceedings suggests substitution of a planar medium, and as with the bulk crystal, continues to depend on an oblique grating (on a z-direction component in the grating), with consequent susceptibility to shrinkage.

In accordance with the present invention, the plane of incidence is "tilted" out of the x-z plane, so as to introduce a y-component of first-order Bragg selectivity in that direction. A variety of embodiments minimize or avoid second order Bragg altogether. Description is largely in terms of a rectilinear array (with overlapping holograms in both x- and y-directions). Apparatus provides for linear stepwise movement of the planar recording medium relative to the beams for recording a first row of holograms, followed by stepping to the next row position, etc. Other arrangements providing for relative movement of medium and hologram position are possible, e.g. by rotation with circular rows of different radii.

Inventive Principle

An attempt is made to describe the invention using terminology familiar to those with less than the most sophisticated understanding of holography. Terminology adopted is, in consequence, somewhat imprecise, but believed suitably descriptive. *J. App. Phys.*, vol. 65, no. 6, pp. 2191–2194, March 1989 contains a rigorous description of related art and is illustrative of texts that may enable the knowledgeable practitioner to express the invention in more precise terminology.

For the same reason, certain simplifications are made in the figure descriptions and in general discussion. Beam directions and angles of incidence are all in terms of center rays. This is accurate for the instance of plane waves, but not for spherical and cylindrical waves. The simplification is believed to be a sufficiently close approximation.

An attempt is made to restrict discussion to measurable geometrically-defined conditions. Angles of incidence are intended to define "outside angles", e.g. of a beam angle in space relative to the recording medium. The functional angle in most instances is the "inside angle", which for non-orthogonal incidence, differs from the related outside angle in accordance with Snell's law. The chief impact of the variation, due to increased refractive index of the medium, is to place a restriction on the maximum attainable inside angle. The consideration is well understood by those familiar with the art.

Figure 2:
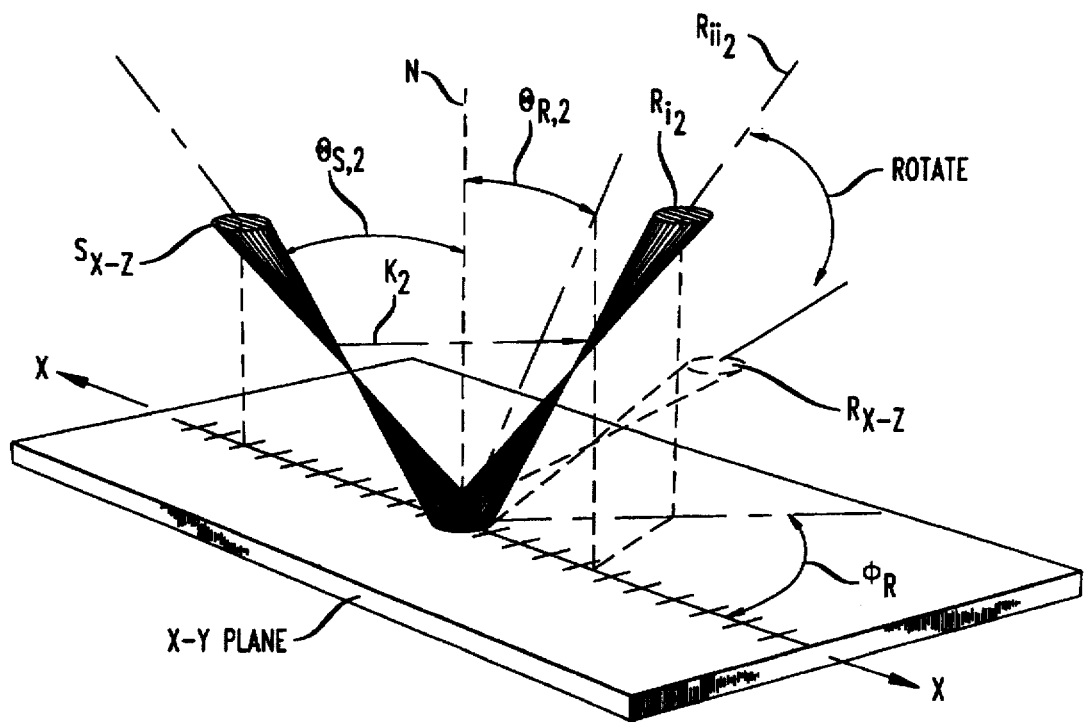
FIG. 2 is a diagrammatic view of an embodiment of the invention in which y-direction first order Bragg selectivity is introduced by changing the direction of the reference beam.
Figure 3:
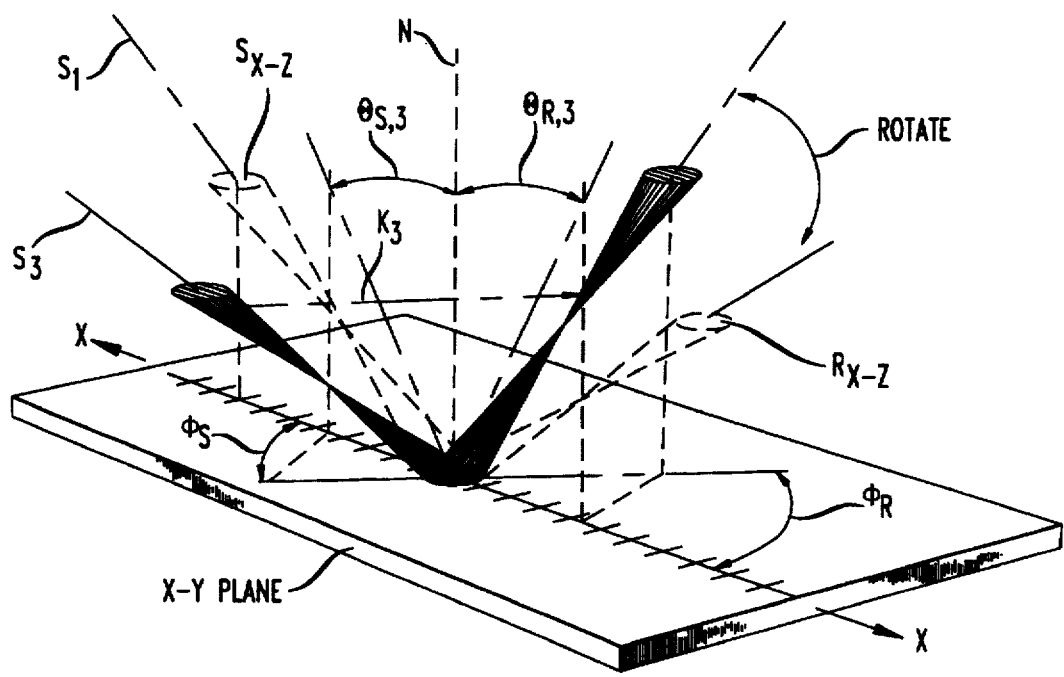
FIG. 3 is a diagrammatic view of another embodiment of the invention enabling first order y-direction Bragg selectivity while minimizing the second order effect.

Reference is made to FIGS. 1–3. All show a medium surface lying on the x-y plane, and an orthogonal x-z plane, with the line of intersection of the two planes defining the x-direction. The x-direction is the shift-direction, showing the direction or relative movement of the recording medium and the hologram produced by the intercept of the two beams on the medium.

Uniform legend designations are used in all of these figures:

S=signal beam
R=reference beam
I=plane of incidence defined by S and R
$\theta$=full angle between components of S and R on the x-z plane
$\phi_S$=the x-y plane component of the angle of divergence of the signal beam relative to the x-z plane—one measure of a contribution to the "tilt" of the plane of incidence.
$\phi_R$=corresponding angular component for the reference beam.
N=the dissecting vector orthogonal to the x-y plane with its origin at the point of intersection of S and R
$\theta_S$="half angle" between the x-z component of S and N
$\theta_R$=corresponding half angle for the reference beam
K=the grating vector (where illumination is not by a single plane wave, the vector chosen as representative is that resulting from interference of the central rays of the signal and reference beams).

Subscripts associate legends: with figures, e.g. $S_1$=signal beam in FIG. 1; with planes, e.g. $S_{xy}$=signal beam component on x-y plane; with direction, e.g. $K_x$=component of grating vector in x; with possible positions, e.g. $S_i$=signal-beam component for initial position. FiG. I represents prior art shift holography, with FIGS. 2 and 3 exhibiting fit within the scope of the claims. A representation, in phantom, of FIG. 1 is included in each of FIGS. 2 and 3.

FIG. 1—The plane of incidence $I_1$ lies on the x-z plane, so that $R_{x-z}$ and $S_{x-z}$ are full magnitude with no component in y, and in which dissecting vector N bisects $\theta$, leaving $\theta_S=\theta_R$. Under these circumstances, grating vector K, lies entirely in x so that $K_x=K$ and $K_y=0$.

Under the conditions of FIG. 1, there is no grating vector in the y-direction so that Bragg selectivity is restricted to x-direction. Here, selectivity in the y-direction requires stepping a distance equal to a full hologram dimension (twice the half "spot" dimension) to avoid overlap. Under one set of test conditions, the spot dimension was about 5 mm. This condition is referred to as "conventional" spatial multiplexing. Under the same test conditions, Bragg selectivity allowed a shift dimension in the x-direction of 5 µm. Selectivity in the y-direction accordingly was about 1/1000 that in the x-direction.

By making the half angles unequal (with $\theta_{S,2} \neq \theta_{R,2}$), there is now a Z component in the Bragg selectivity, which introduces second order Bragg selectivity in the y-direction. In general, this second order effect, which varies as $\sqrt{\lambda/t}$ (in which t is the thickness of the recording medium), unduly compromises the far more significant first order Bragg selectivity in the x-direction (which varies as the first power of $\lambda/t$ for useful small shift distances). Without a much thicker medium, the second order effect is inadequate for contemplated purposes. In any event, use of second order Bragg selectivity is effectively precluded by shrinkage of state-of-the-art film materials.

FIG. 2—Here, the reference beam R has pivoted out of the x-z plane without change in angle of incidence with the x-y plane. Accordingly, half angles $\theta_{S,2}$ and $\theta_{R,2}$ (component angles as measured on the x-z plane) are unequal, resulting in grating vector, $K_2$, which is slanted out of the x-y plane, with an inplane component $K_{x-y}$ in turn with in-plane components both in the x and y directions.

This meets the inventive requirement of introducing a grating component $K_y$, in consequence, introducing first order Bragg selectivity in that direction. This in mm results in some shortening in $K_x$, with attendant loss in x-direction selectivity. There is a net gain as compared with y-selectivity introduced by the slanted grating resulting from introduction of a z-component.

For the arrangement shown, the half angles are unequal so that there is now a z-component of Bragg selectivity. This second order effect is of finite but small value.

FIG. 3—In the system shown R has been pivoted. At the same time, the signal beam has been pivoted so as to maintain the plane of incidence orthogonal to x-y (but rotated relative to x-z). $\theta_{S,3}$ is maintained equal to $\theta_{R,3}$ so that there is no z-component in the Bragg selectivity. In this manner, y-selectivity is gained with relatively small loss in x-selectivity.

Magnitude limits on $\theta_S$ and $\theta_R$ are likely based on equipment and other practical limitations. The condition under which the plane of incidence is tilted out of x-z, while maintaining $\theta_S=\theta_R$, is a preferred embodiment.

Replication—Many contemplated uses require making copies of the holographic array "master". This problem has been addressed for non-multiplexed holograms. *Handbook of Optical Holography*, Academic Press 1979, at pp. 373–377, describes a variety of techniques. One method, "copying by reconstruction", first reconstructs the image and thereafter records a new hologram. The method of applicable to thick as well as thin holograms, and has been used for multiplexed holograms as well. Using a conventional, single-illumination source for multiplexed holograms, it is necessary to reconstruct and copy "one at a time". An alternative, permitting simultaneous replication of multiple holograms uses mutually incoherent illumination sources. See, Optics Letters, vol. 17, no. 9, pp. 676–678, 1992.

Copying by reconstruction is usefully employed in the present work. The multiplexing step, independent of the individual hologram replication step, now follows the new procedure—medium and/or beams are stepped between sequential recordings.

Applications

The advance offers significant service opportunities. The holographic array, now in the possession of a user, may be selectively accessed for pay. An analogous prior art practice uses CD ROMs in which partitioned contents each containing prescribed software or data, with access to specific parts granted by corresponding access codes. See, CD-ROM Librarian, vol 7, no. 4, pp. 16–21, April 1992. Under certain circumstances, the array may be maintained on a local user site, with access to its entirety granted as part of an initial sale, by use fee or subscription.

In most uses, hologram/multiplex recording serves only for initial supply. The methods are suitable for such "read only" applications. Other uses are served by "write once"—as in creation of a lasting database.

Apparatus

Figure 4:
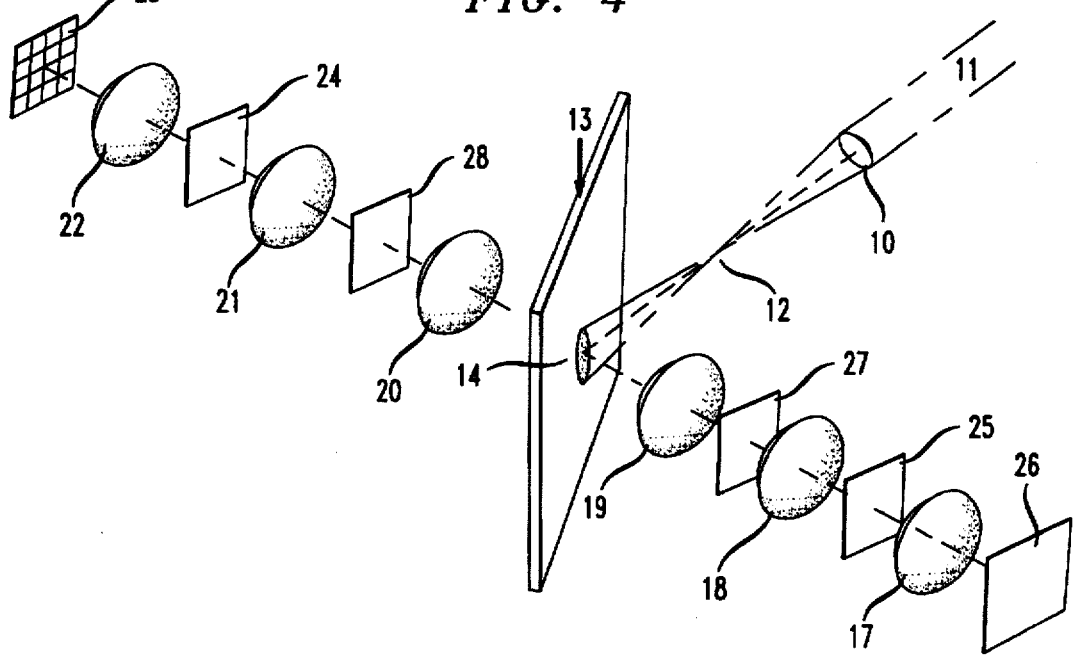
FIG. 4 is diagrammatic view of one form of apparatus suitable for practice of the invention.

The FIG. 4 apparatus was used for developing the criteria of fit shift holography. To avoid the slight effect of second order Bragg selectivity resulting from illumination by a spherical beam, illumination was through a cylindrical lens. Multiple plane waves may be used instead of a cylindrical beam.

A reference beam without a significant y-direction component of momentum was produced by cylindrical lens 10. Lens focus 12 was at a distance, d, from recording medium 13, producing a reference beam spot 14 in the medium. Spot size was of area sufficient to cover the signal beam spot. The signal beam was produced by illumination of spatial light modulator 26. The modulator allowed tailoring of individual holograms for experimental purposes. A Fourier transform of transparency 26 was produced in spot 14 by lens series 17, 18, 19, all in 4F configuration (17–26 and 19–14 spacings equal to focal distance, 17–18 and 18–19 spacings equal to the sum of focal distances of the lens pairs). Readout was by 4F-configured lenses 20, 21 and 22, to result in a reconstructed image on detector 23. Three additional holograms, produced upon successive relative repositioning of the medium, are shown in phantom. The first, produced in spot 28, is located at the overlapping shift position following that of spot 14. The others, produced in spots 29 and 30, are overlapping and located in an adjacent row. As shown, the four holograms constitute a portion of an array comprising overlapping straight parallel rows of overlapping holograms.

Equipment variations, some of which were used in reported experimental work follow conventional practice. Elimination of a lens in each of the series 17–19 and 20–22, with the remaining lenses arranged in 4F configuration, substitutes image recording and continues to produce a reconstructed image on the detector. A filter 25 consisting of an apertured mask at the Fourier plane permitted passage of only the $0^{th}$ diffraction order. A random phase diffuser in contact with spatial light modulator 26 or at image plane 27 in the signal beam may be used to smear out the Fourier transform and to improve recording fidelity. An image plane filter 28 may be used for aperture selection in accordance with co-filed U.S. patent application Ser. No. 08/435,682. Noise from other sources may be avoided by spatial filtering at plane 24.

Figure 5:
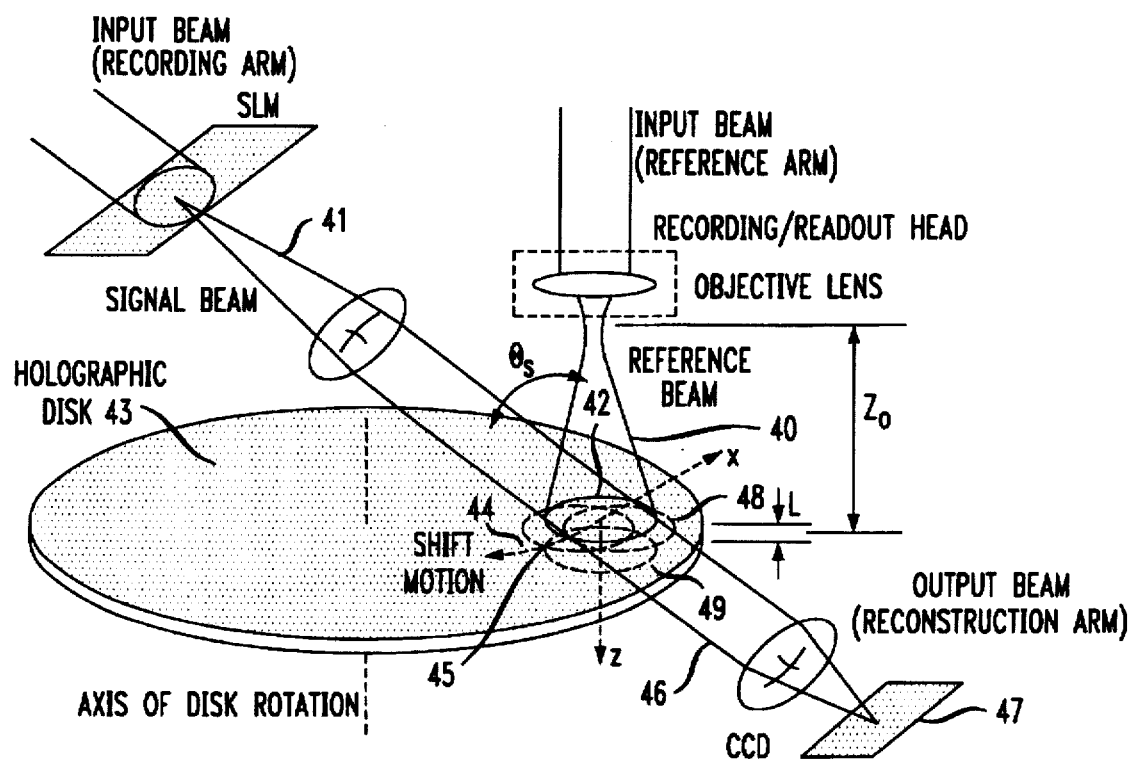
FIG. 5, labeled "Prior Art", is a copy of a figure in Pu et al, cited above, being a diagrammatic view of a "shift holography" system, but with two added holograms shown in phantom.

Prior art FIG. 5, taken from A. Pu et al, cited in "Description of Related Art", shows a system alternative to that of FIG. 4. This figure shows apparatus and process as including a fixed position reference beam 40, which interferes with a signal beam 41 to produce hologram 42 on disk-shaped medium 43. Shifting is accomplished by rotating the disk to result in a shift motion 44 of a few microns, allowing a new partially overlapping hologram 45 to be recorded in the shifted position. Holograms 46 and 47 are produced in the same manner in an adjacent row, in this instance a circular row resulting from the same rotational motion, but following relative motion of medium and beams in a radial direction. The four holograms constitute a portion of an array of circular rows. In reconstruction, use is made of a readout beam identical to the reference beam used in recording, to produce a reconstructed beam 46, resulting in an image on the detector.

EXAMPLE

The recording material used was an x-cut, 2 mm thick, piece of Fe-doped $LiNbO_3$. Illumination was by an argon ion laser emitting at $\lambda=514$ nm. The emitted beam was split to produce reference and signal beams separated by a full angle $\theta=75°$ as incident on the recording medium. The reference beam focus was 4 mm from the recording medium (d-4 mm). The focal length of lens 20, the readout lens closest to the hologram, was 200 mm. Cylindrical lens 10 had a focal length of 100 mm and an F number of 2. The angular component of the reference beam in the y-direction was approximately 17°. Selectivity in the x-direction was maintained at about 10 μm. Selectivity in the y-direction was less than 200 μm. This compared with y-direction selectivity of about 4 mm for traditional spatial multiplexing under the conditions of the experiment.

Variations

While description has been in terms of relative movement of the recording medium and the beams, specific apparatus discussion has largely been for a mechanically-moved medium. For many contemplated uses, use of a stationary medium and moving beams may be useful—may permit more rapid access. Such beam steering may reproduce the conditions for a stationary beam and moving medium. The facility may expedite alternatives to simple linear stepping.

The methods are applicable to non-planar media—to cylinders and other geometric forms. In such instances, directions should be construed as instantaneous.

FIGS. 2, 3 are reasonably illustrative in that, taken together, they include contemplated variations. Other arrangements are operative. Second order Bragg selectivity is ordinarily non-preferred (so that equality of $\theta_S$ and $\theta_R$ is maintained), the plane of incidence need not be orthogonal to the x-y plane.

Under many circumstances y-selectivity is desirably the same as x-selectivity. For the preferred embodiment in which $\theta_S=\theta_R$, this condition is satisfied when the angle between the x-direction and the intercept, of the beam plane with the x-y plane, is 45° (when the "divergence angle" is 45°). For recording media which are isotropic in-plane, packing density is limited by practical considerations. Snell's law may prevent attainment of desired equality in x- and y-selectivity. As compared with the conditions of FIG. 1 (selectivity in x=51 μm, selectivity in y=5 mm) density is increased by a factor of several hundred.

A. P. Yakimovich, in Opt Spectrosc. (USSR) vol. 47, no. 5, November 1979, pp. 530–535, presents a model for z-direction selectivity for a spherical reference beam and a thick medium. In experiment, it has been possible to multiplex in the z-direction based on this mechanism, although to date packing densities have been only in the single digits.

While inadequate for replacing x- and y-multiplexing, it may be used in combination with the inventive procedures.

Discussion of FIGS. 1–3 has been in terms of a multiple plane wave reference beam with no components in the y-direction. A cylindrical reference beam, equivalent to an infinite number of such plane waves introduces no complication. A spherical reference beam, with some attendant y-selectivity, does not introduce any qualitative change (although there is some minor lessening in the advantage of tilting).

The multiplexing method of the invention is not specific to this particular form, so that recording may be based on reflection holography, may image the signal on the medium, or may record the hologram on a plane intermediate the Fourier and image planes of the signal.

In addition, no effort is made to include all possible geometries. As an example, "rows" and "columns" of holograms are invariably described as in rectilinear arrangement and as coinciding with the recording schedule. Equivalent arrangements may result from e.g. oblique recording direction produced by perhologram shift-step sequencing.

Relative Motion—Prior art shift holography depends upon the concept whereby successive holograms are recorded to be partially overlapping. Generally, major portions of succeeding holograms occupy the same volume, with the portions occupying fresh volume defined by "shift". The identical concept plays a role at least in a preferred embodiment of the present invention. In order for this to occur in recording, it is necessary that position of incidence of the beams in the vicinity of the interference region be moved relative to the medium—during reconstruction, the analogous relative motion entails the single readout beam, so that the position of incidence is now determined by the position of the hologram to be accessed.

Relative motion may be produced by movement of the medium, or by movement of the beams. Alternative to movement of the entire beam (by movement of source and all optical elements), the latter may take the form of a variety of forms of "beam steering", in which only a part of the optical train associated with the relevant beam is changed—by physical motion, by introduction of an additional element, etc. The terminology "moving the medium and the beams relative to each other" in appended claims is intended to include all such variations.

What is claimed is:

1. Process for shift holography in which an array of holograms is recorded in a recording medium defining the x-y plane, the array consisting of holograms each produced by interference of a reference beam and a signal beam together defining a plane of incidence, and each consisting of a multiplicity of holographic grating vectors having a predominant grating vector direction in the x-y plane, the array consisting of successive rows of partially overlapping holograms produced by movement of the recording medium relative to the beams in the shift direction, thereby defining the x-direction, with successive rows produced by movement in the direction orthogonal to the shift direction, thereby defining the y-direction, whereby partially overlapping holograms may be individually read out using Bragg selection,

CHARACTERIZED IN THAT the line of interception of the plane of incidence and the x-y plane is non-coincident with the shift direction, and diverges by a divergence angle as measured in the x-y plane, whereby a grating vector component is introduced into the y-direction, thereby permitting first-order Bragg selectivity in the y-direction and serving for selection of partially overlapping holograms in the y-direction.

2. Process of claim 1 in which the divergence angle is at least 5°.

3. Process of claim 2 in which the angles made by a line between the z-direction and the x-z components of the signal beam and the reference beam are equal.

4. Process of claim 1 in which the plane of incidence is orthogonal to the x-y plane.

5. Process of claim 4 in which the divergence angle is approximately 45°.

6. Process of claim 1 in which the reference beam is substantially cylindrical.

7. Process of claim 1 in which the reference beam is constituted of multiple plane waves.

8. Process of claim 1 in which the reference beam is substantially spherical.

9. Process of claim 1 in which the recording medium is substantially planar.

10. Process of claim 1 in the array comprises overlapping rows of overlapping holograms.

11. Process of claim 10 in which an individual row is recorded prior to a sequential row.

12. Process of claim 10 in which rows are substantially straight and parallel.

13. Process of claim 10 in which rows are substantially circular.

14. Process of claim 10 in which holograms in x- or y-direction are staggered.

15. Process of claim 1 in which relative motion between the medium and the beams is produced by moving the medium relative to stationary beams.

16. Process of claim 1 in which shifting is accomplished by moving the beams relative to the recording medium.

17. Process of claim 1 in which the process includes a reconstruction step in which holograms are reconstructed.

18. Process for shift holography comprising reconstruction of holograms within an array of holograms in a medium, the array consisting of successive overlapping rows of overlapping holograms, the process comprising illuminating selected holograms by a readout beam and detecting a resultant reconstructed image produced by a reconstructed image beam, the two beams defining a readout plane, in which selection is by positioning of the readout beam relative to the medium, whereby partially overlapping holograms are individually reconstructed using Bragg selectivity,

CHARACTERIZED IN THAT row direction differs by an angle of divergence from the line of intersection of the readout plane and the medium.

19. Process of claim 18 in which the divergence angle is at least 5°.

20. Process of claim 19 in which the readout plane is orthogonal to the medium.

21. Process of claim 19 in which the divergence angle is approximately 45°.

22. Process of claim 18 in which the reference beam is substantially cylindrical.

23. Process of claim 18 in which the reference beam is constituted of multiple plane waves.

24. Process of claim 18 in which the reference beam is substantially spherical.

25. Process of claim 18 in which the recording medium is substantially planar.

26. Process of claim 18 in which rows are substantially straight and parallel.

27. Process of claim 18 in which rows are substantially circular.

28. Process of claim 18 in which relative motion between the medium and the beams is produced by moving the medium relative to stationary beams.

29. Process of claim 18 in which shifting is accomplished by moving the beams relative to the recording medium.

30. Process of claim 18 including recording of at least one hologram.

31. Process of claim 18 in which the array comprises portions, each portion including multiple holograms, the process providing for access to selected portions of the array.

32. Process of claim 31 in which the medium is in the possession of a user and access information for accessing a portion is in the possession of a service provider.

33. Process of claim 18 in which information required for access is restricted to qualified users.

* * * * *